UNITED STATES PATENT OFFICE.

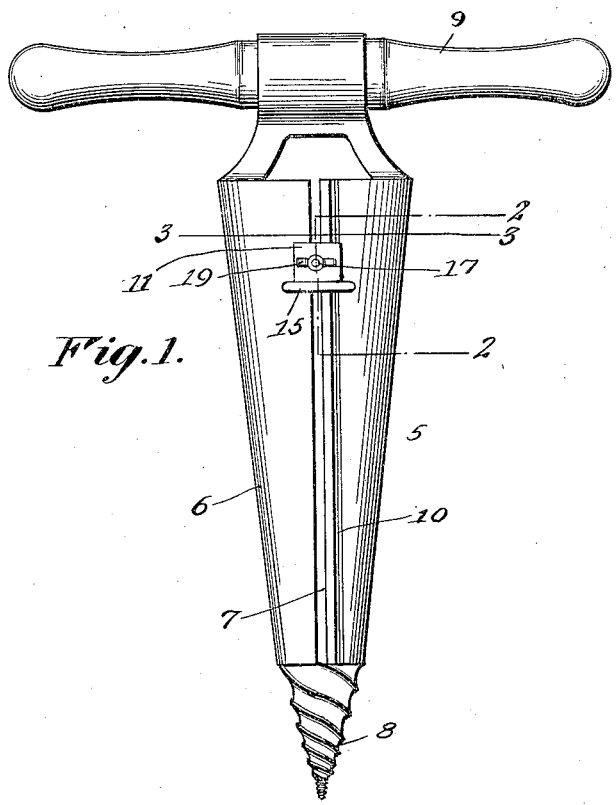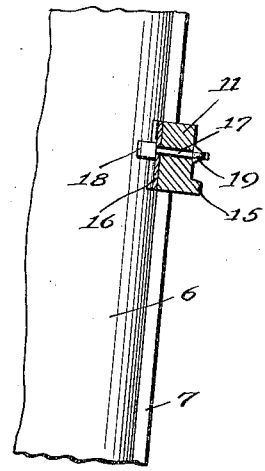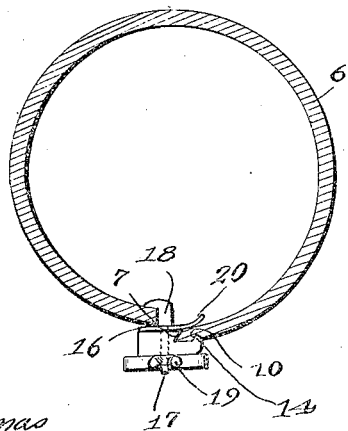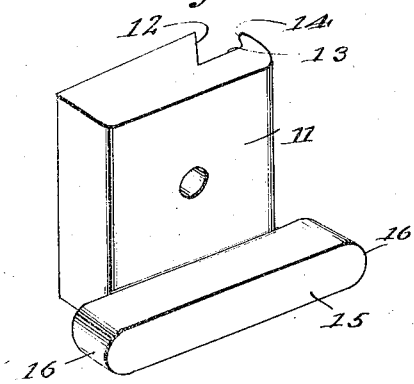

RAYMOND PREW, OF DETROIT, MICHIGAN.

AUGER.

1,352,313.

Specification of Letters Patent.   Patented Sept. 7, 1920.

Application filed February 2, 1920. Serial No. 355,876.

*To all whom it may concern:*

Be it known that I, RAYMOND PREW, a citizen of the United States, residing at Detroit, in the county of Wayne and State of Michigan, have invented new and useful Improvements in Augers, of which the following is a specification.

In tapping valves for the insertion of spigots for drawing off the contents of the barrel, the most common form of auger employed is that of a hollow conical body which is slotted longitudinally and has one of its ends projected beyond its other edges. The projecting edge is sharpened and produces the cutting member, while the reduced end of the auger is formed with a screw for the first insertion in the wood. As the body of the auger is conical it will be apparent that holes of various diameters can be made. This is very desirable in some instances, but in others it proves to be a deficiency inasmuch as spigots of a certain determined size are generally employed for drawing off the varying contents of barrels, as for instance one size of spigots is almost universally employed for drawing off oil from barrels. It will thus be noted that unless the bore is very precise in the boring operation too large a hole may be made for the spigot which of course, results in a loss of oil.

It is the object of the present invention to provide an auger of this class with a gage that shall be in the nature of a stop member so that either too large or too small a hole will not be made, but one that will properly receive the predetermined size of spigots.

It is a further object of the invention to produce an attachment for augers in the nature of a stop which may be easily, quickly and efficiently secured on the auger.

It is a still further object of the invention to produce an attachment for augers that shall be of a simple construction, cheap to manufacture, easily applied to the auger, adjustable thereon, and thoroughly efficient for the purpose for which it is intended.

The foregoing objects, and others which will appear as the nature of the invention is better understood, may be accomplished by a construction, combination and operative arrangement of parts such as is disclosed by the drawings.

In the drawings:—

Figure 1 is an elevation of an auger with my attachment arranged thereon.

Fig. 2 is a sectional view approximately on the line 2—2 of Fig. 1, upon an enlarged scale.

Fig. 3 is a sectional view approximately on the line 3—3 of Fig. 1, also on an enlarged scale.

Fig. 4 is a perspective view of the stop gage.

An auger is broadly indicated by the numeral 5. The body of the auger is of hollow conical construction and is indicated by the numeral 6. The body is slit longitudinally and one of its edges at the said slit is arranged inward of the other edge. The last mentioned edge, indicated by the numeral 7 is sharpened and provides the cutting member of the auger, and the auger at its reduced end has a threaded extension 8, and at its widened end is provided with a handle 9.

In carrying out my improvement I form the cutting edge of the auger, slightly inward of its sharpened point with a longitudinal groove 10.

My improvement is broadly indicated by the numeral 11, the same including a block-like body of a width greater than the distance between the confronting edges of the auger. The block 11, upon one of its inner corners is cut longitudinally to provide a depression that declines in an angle wall 12 formed at the side of the block, and an inner straight wall 13 that is parallel to the angle wall. The inner wall 13 at its outer edge is formed with an outwardly extending bead 14, and this bead is designed to be received in the groove 10. The angle wall 12 is adapted to contact with the angle edge of the cutting portion of the auger.

On the outer face of the block 11 there is an outwardly extending laterally disposed foot member 15 that has its ends rounded upwardly as at 16. The foot 15 provides the stop proper, as the same contacting with the barrel in which the hole is bored will limit the movement of the auger through the barrel. To accomplish this it is, of course, necessary to hold the block against longitudinal movement. Therefore, on the inner face of the block I arrange a metal finger 16, which is preferably of a resilient nature. This finger, adjacent to its inner end is provided with an opening that alines with a similar opening in the block 11. Passing through these alining openings is the reduced and threaded shank 17 of a bolt member. The bolt is provided with an elongated preferably rectangular head 18. The head is of a length to contact with the straight wall provided by the inner member of the auger at the slit portion thereof. The extending portion of the bolt is engaged by a thumb nut 19 that contacts with the outer face of the block. The finger 16 preferably has its free end curved upon itself and directed toward the outer face of the block, the last mentioned portion being indicated by the numeral 20. It will be apparent that when the thumb nut is tightened upon the bolt the spring finger 16 will hold the cutting edge of the auger in the depression or pocket provided in the block, causing the bead 14 to be tightly received in the groove 10, and the arched or curved portion of the finger to tightly contact with the inner face of the cutting edge of the auger. In addition to this the squared or rectangular head 18 of the bolt 17 contacting with the straight edge of the inner jaw of the auger will hold the block against movement in the direction of the said jaw, and will also tend to hold the block against longitudinal movement.

It is thought that the simplicity of the construction and the advantages thereof will be apparent from the foregoing description without further detail description.

Having thus described the invention, what I claim is:—

1. In combination with a hollow cone shaped auger which is slitted longitudinally to provide an outer cutting jaw and an inner inactive jaw, and said cutting jaw having a longitudinal groove on its outer face, of a gage block having a pocket to receive the cutting edge of the cutting jaw and a bead to be received in the groove of the cutting jaw, removable and adjustable means carried by the block for contacting with the inner face of the cutting jaw for retaining the same in the pocket and for locking the block adjustable to the jaw.

2. In combination with a hollow cone shaped auger which is slitted longitudinally to provide an outer cutting jaw and an inner inactive jaw and the said cutting jaw having a longitudinal groove, of a gage block having one of its corners provided with a pocket to receive the cutting edge of the jaw and having a bead to be received in the groove of the jaw, said block having a foot on its outer face the ends of which being rounded upwardly, a spring finger on the inner face of the block designed to contact with the inner face of the cutting jaw, adjustable means for holding the finger upon the block and the same in engagement with the cutting jaw, and said means also contacting with the end of the inactive jaw for holding the block against lateral movement with respect to the auger.

In testimony whereof I affix my signature.

RAYMOND PREW.